M. M. MUELLER.
STEERING GEAR LOCK FOR MOTOR VEHICLES.
APPLICATION FILED JULY 7, 1919.
1,381,000.
Patented June 7, 1921.
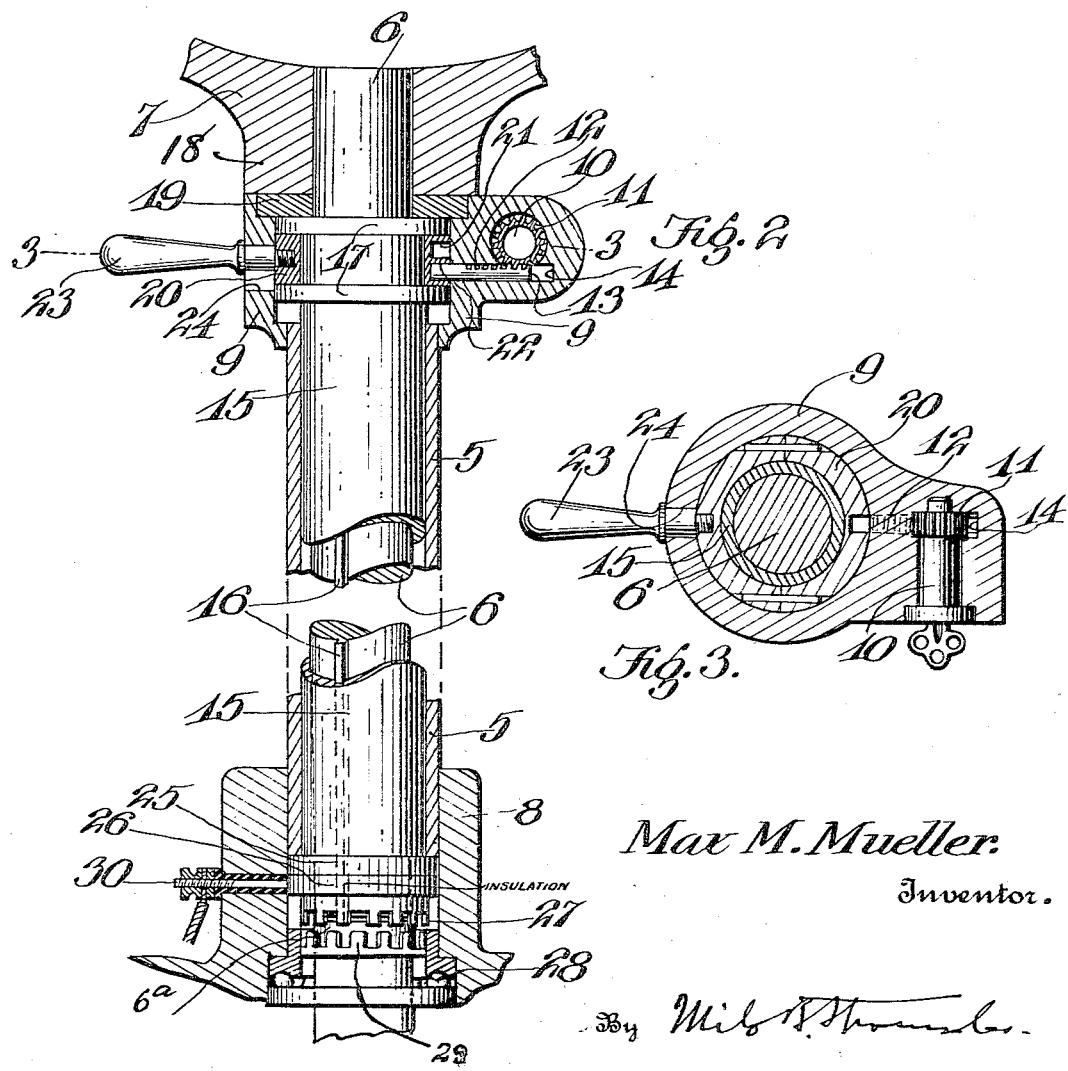
Max M. Mueller,
Inventor.

UNITED STATES PATENT OFFICE.

MAX M. MUELLER, OF CHICAGO, ILLINOIS.

STEERING-GEAR LOCK FOR MOTOR-VEHICLES.

1,381,000. Specification of Letters Patent. Patented June 7, 1921.

Application filed July 7, 1919. Serial No. 308,948.

*To all whom it may concern:*

Be it known that I, MAX M. MUELLER, a citizen of the United States, residing at Chicago, in the county of Cook and State of Illinois, have invented new and useful Improvements in Steering-Gear Locks for Motor-Vehicles, of which the following is a specification.

This invention relates to devices for preventing the theft and unauthorized use of motor vehicles, by disconnecting the steering wheel from the steering gear, so that the steering wheel now turns freely without imparting motion to the mechanism by which the front wheels are shifted to govern the direction of the car.

The invention has for its object to provide a device for the purpose stated which operates in an inaccessible place so that it will be difficult to tamper with the same, and also to provide a device of the kind stated which is simple in construction and efficient in operation.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of the lock of the device;

Fig. 2 is an enlarged vertical section of the device, and

Fig. 3 is a cross section on the line 3—3 of Fig. 2.

Referring specifically to the drawing, 5 denotes the steering gear tube or column in which is housed the steering gear post 6 to the upper end of which latter the hand wheel 7 is made fast. The lower end of the tube 5 is fixed to a housing 8.

The tube 5 terminates short of the hand wheel 7 and to its upper end is fastened the casing 9 of a lock having a rotatable, key operated tumbler 10, the latter being provided with a pinion 11 which is in mesh with rack teeth 12 on a reciprocatory bolt 13 slidable in a recess 14 in the lock casing.

On the post 6 is slidably, but non-rotatably mounted a long sleeve 15, a key or spline 16 preventing relative rotation of said parts. This sleeve also extends into the lock casing 9, and on the inside of the latter the sleeve has two spaced annular flanges 17. The upper end of the sleeve is spaced from the hub 18 of the hand wheel 7 by a plate 19 made fast to the lock casing.

Between the flanges 17, the sleeve 15 carries a ring 20 which is loose and made in halves, as shown in Fig. 3, so that it may be assembled on the sleeve. One side of the ring 20 has two vertically spaced peripheral recesses 21 and 22, respectively, and at the opposite side is secured a handle 23 issuing from a vertical slot 24 in the lock casing 9.

The bolt 13 is positioned transversely with respect to the ring 20 and it is designed to be advanced into the recesses 21 or 22, upon bringing the same into alinement with the bolt, which is done by shifting the ring up or down, and as the ring is carried by the sleeve 15 between the flanges 17 thereof, the sleeve is also moved lengthwise.

Within the housing 8, the sleeve 15 carries two superposed rings 25 and 26, respectively, and its lower end has a circle of clutch teeth 27. In line with the steering post 6, at the lower end thereof, is a separate section $6^a$ which is connected to the steering gear by which the wheels are shifted, it being understood that there is no direct connection between said parts and the post 6, and hence the steering gear cannot be operated except when the post 6 is clutched or locked to the section $6^a$. The means for locking the parts 6 and $6^a$ together comprises a toothed clutch collar 29 fast on the upper end of the section $6^a$ and having its teeth opposite the clutch teeth 27 on the sleeve 15 which is slidable on and rotatable with the post 6.

Fig. 2 shows the sleeve 15 in elevated position and so held by the bolt 13 advanced into the keeper recess 22. The clutch member 27 is now out of mesh with the clutch member 29, and hence the post 6 and its wheel 7 are disconnected from the post $6^a$ of the steering gear. The post 6 is now left free to turn without affecting the steering gear, and hence the car now cannot be steered. To connect the hand wheel 7 to the steering gear, the bolt 13 must first be retracted, after which the handle 23 may be pushed down in the slot 24, which slides the sleeve 15 downward and brings the clutch member 27 into mesh with the clutch member 29, and as the steering gear is connected to the latter clutch member through the post section $6^a$ carrying the same, the hand wheel 7 is now coupled to the steering gear and the car may be steered. The bolt 13 may then be advanced into the keeper recess 21, which locks the mechanism in operative position. As the bolt 13 is operated by a key, the mechanism is positively locked in inoperative as well as operative positions, and as the clutch members are completely inclosed in the housing 8, said parts are not readily accessible and hence are not easily tampered with.

The device can also serve as an ignition lock through the rings 25 and 26, the former being a metal ring and the latter being a ring of insulating material. A ground connection 30 is applied to the housing 8 to contact with either ring as the sleeve 15 is moved up or down. Thus, when the steering gear is uncoupled as shown in Fig. 2, the ground connection is broken by the same being in contact with the ring 26 of insulation, and when the sleeve 15 is moved down to engage the clutch members, the ground connection is reëstablished by the contact between the same and the metal ring 25. The housing 8 contains a ball thrust bearing 28 for the upper end of the post section 6$^a$.

I claim:

1. The combination of a steering gear having a clutch member, a rotatable steering post, a sleeve rotatable with and slidable on the stering post, a tube in which the post and the sleeve are housed, a clutch member on the sleeve adapted to engage the first-mentioned clutch member to establish a driving connection between the steering post and the steering gear when the sleeve is slid in the direction of said first mentioned clutch member, means for sliding the sleeve, and means for locking the sleeve against a sliding movement.

2. The combination of a steering gear having a clutch member, a rotatable steering post, a sleeve rotatable with and slidable on the steering post, a tube in which the post and the sleeve are housed, a clutch member on the sleeve adapted to engage the first-mentioned clutch member to establish a driving connection between the steering post and the steering gear when the sleeve is slid in the direction of said first mentioned clutch member, a ring rotatably and non-slidably mounted on the sleeve, and a lock-controlled bolt engageable with the ring.

3. The combination of a steering gear having a clutch member, a rotatable steering post, a sleeve rotatable with and slidable on the steering post, a tube in which the post and the sleeve are housed, a clutch member on the sleeve adapted to engage the first-mentioned clutch member when the sleeve is slid in the direction thereof, a ring rotatably and non-slidably mounted on the sleeve, and a lock-controlled bolt engageable with the ring, said ring having keeper recesses for the bolt spaced in the direction of the length of the sleeve.

4. The combination of a steering gear having a clutch member, a rotatable steering post, a sleeve rotatable with and slidable on the steering post, a tube in which the post and the sleeve are housed, a clutch member on the sleeve adapted to engage the first-mentioned clutch member to establish a driving connection between the steering post and the steering gear when the sleeve is slid in the direction of said first mentioned clutch member, a ring rotatably and non-slidably mounted on the sleeve, a lock-controlled bolt engageable with the ring, and a casing inclosing the bolt and the ring, said casing being carried by the aforesaid tube.

5. The combination of a steering gear having a clutch member, a rotatable steering post, a sleeve rotatable with and slidable on the steering post, a tube in which the post and the sleeve are housed, a clutch member on the sleeve adapted to engage the first-mentioned clutch member when the sleeve is slid in the direction thereof, a ring rotatably and non-slidably mounted on the sleeve, a lock-controlled bolt engageable with the ring, a casing inclosing the bolt and the ring, said casing being carried by the aforesaid tube, and a handle connected to the ring and projecting from the casing, the latter having a slot through which the handle extends.

6. The combination of a steering gear having a clutch member, a rotatable steering post, a sleeve rotatable with and slidable on the steering post, a tube in which the post and the sleeve are housed, a clutch member on the sleeve adapted to engage the first-mentioned clutch member when the sleeve is slid in the direction thereof, means for sliding the sleeve, means for locking the sleeve against a sliding movement, rings of conducting and non-conducting material on the tube, and a ground connection adapted to make contact with one or the other of said rings when the tube is slid.

7. The combination of a steering gear tube, a housing to which the tube is fastened at its base, a rotatable steering post, a hand wheel attached to the steering post and located at the upper end of the aforesaid tube, a sleeve rotatable with and slidable on the steering post, said sleeve and post being housed in the tube, a steering gear having a clutch member, a coöperating clutch member on the sleeve for establishing a driving connection between the steering post and the steering gear, means for sliding the sleeve, and means for locking the sleeve against a sliding movement, the clutch members being inclosed in the aforesaid housing, and the two last mentioned means being positioned adjacent to the hand wheel.

In testimony whereof I affix my signature.

MAX M. MUELLER.